United States Patent
Didone et al.

(10) Patent No.: US 6,615,860 B2
(45) Date of Patent: Sep. 9, 2003

(54) FIRE BLOCK CONDUIT COUPLER

(75) Inventors: Brian M. Didone, Georgetown (CA); Manfred Harle, Brampton (CA)

(73) Assignee: Royal Group Technologies Limited, Woodbridge (*) Notice: Subject to any disclaimer, the term of this patent is extended or adjusted under 35 U.S.C. 154(b) by 0 days.

(21) Appl. No.: 10/045,655

(22) Filed: Jan. 15, 2002

(65) Prior Publication Data

US 2003/0131881 A1 Jul. 17, 2003

(51) Int. Cl.[7] .............................. F16K 17/38; F16L 5/04
(52) U.S. Cl. ................................. 137/75; 137/79; 152/1
(58) Field of Search .............................. 137/74, 75, 79; 52/1, 232

(56) References Cited

U.S. PATENT DOCUMENTS

| | | | | |
|---|---|---|---|---|
| 4,136,707 A | * | 1/1979 | Gaillot et al. ................. | 137/75 |
| 4,538,389 A | * | 9/1985 | Heinen ......................... | 137/75 |
| 4,559,745 A | * | 12/1985 | Wexler .......................... | 52/1 |
| 4,642,956 A | * | 2/1987 | Harbeke ....................... | 52/232 |
| 4,850,385 A | * | 7/1989 | Harbeke ....................... | 137/75 |
| 5,331,946 A | * | 7/1994 | Yamini et al. ................. | 52/1 |
| 5,390,465 A | * | 2/1995 | Rajecki ........................ | 52/232 |
| 5,452,551 A | * | 9/1995 | Charland et al. ............. | 52/232 |
| 5,456,050 A | * | 10/1995 | Ward ........................... | 52/1 |
| 5,548,934 A | * | 8/1996 | Israelson ..................... | 52/1 |
| 5,634,304 A | * | 6/1997 | Sakno ......................... | 52/232 |
| 5,927,312 A | * | 7/1999 | Dryden et al. ................ | 137/75 |

FOREIGN PATENT DOCUMENTS

| | | |
|---|---|---|
| DE | 2713689 A | 10/1977 |
| DE | 29712909 U1 | 10/1997 |
| DE | 19617017 A | 12/1997 |

* cited by examiner

*Primary Examiner*—John Rivell

(57) ABSTRACT

A coupler which is used in coupling plastic conduit through a separation in a building has plastic end regions for an overlapped accurately positioned sealed coupling with the plastic conduit to each end of the coupler. The plastic end regions are separated by an intermediate region formed by a wall of plastic based intumescent material which defines a fluid flow passage through the coupler. The fluid flow passage wall has a sufficient thickness of the intumescent material to produce a complete blockage of the passage when the coupler is subjected to conditions which cause an intumescing of the intermediate region wall material.

16 Claims, 4 Drawing Sheets

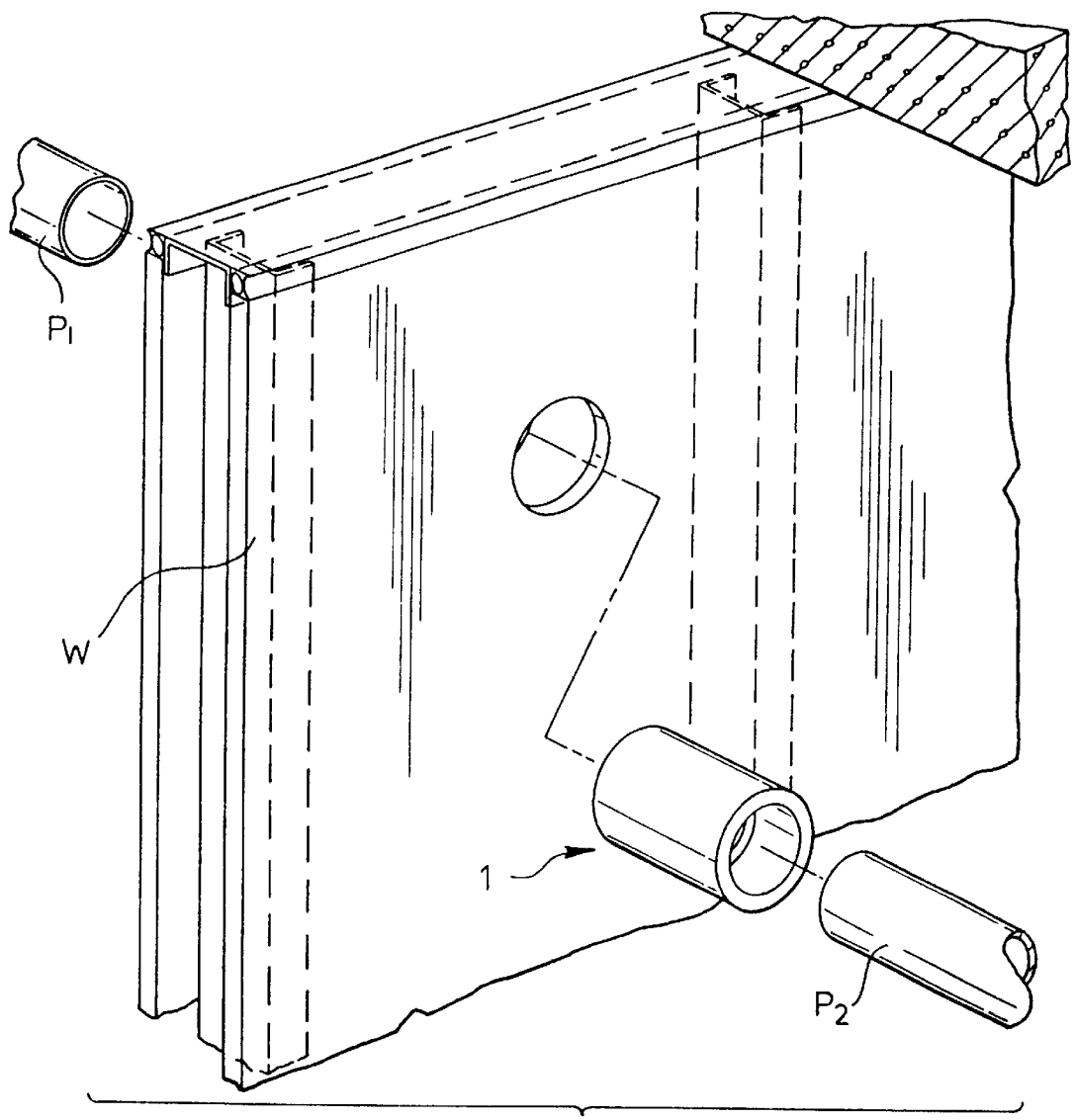
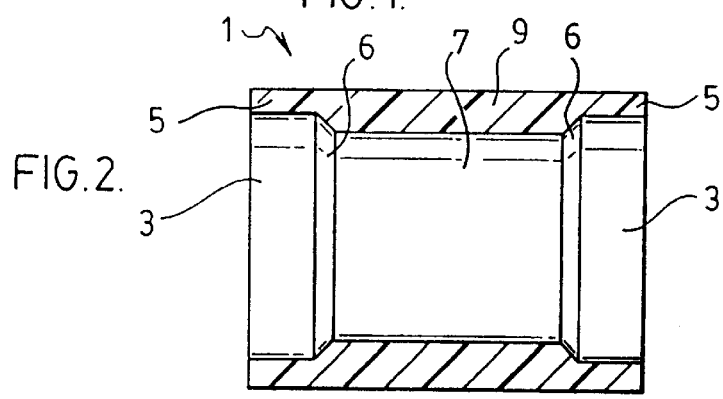

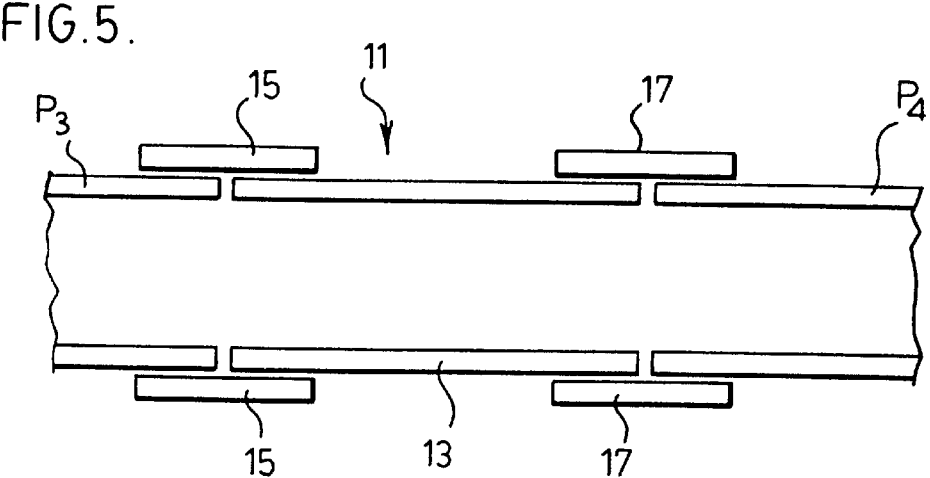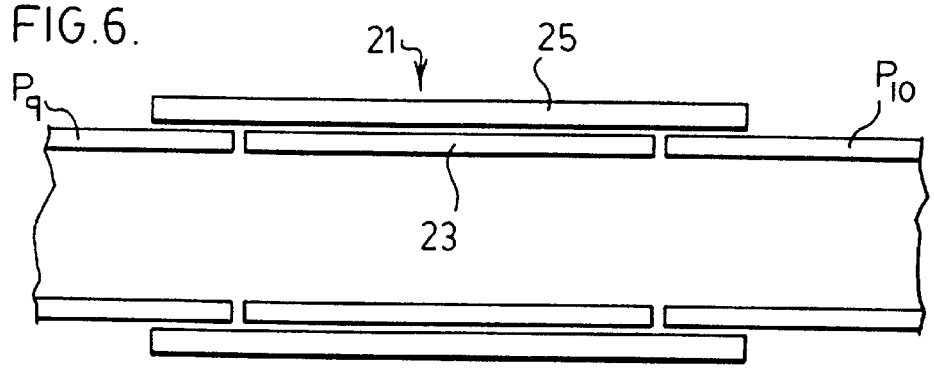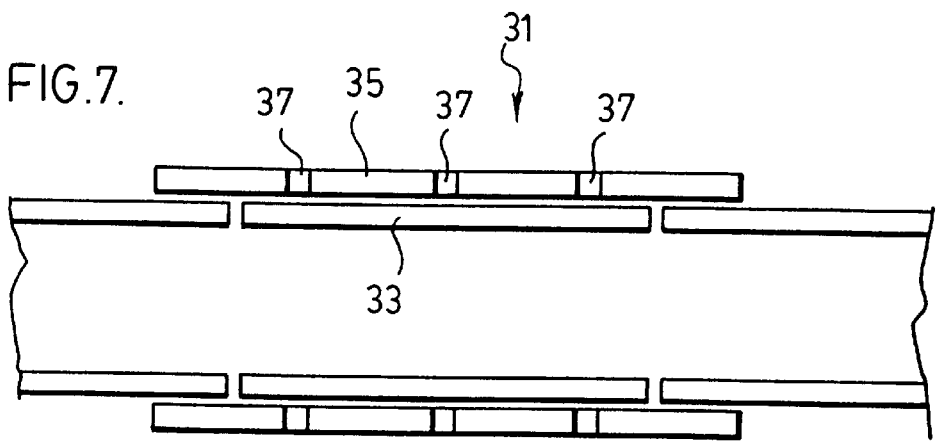

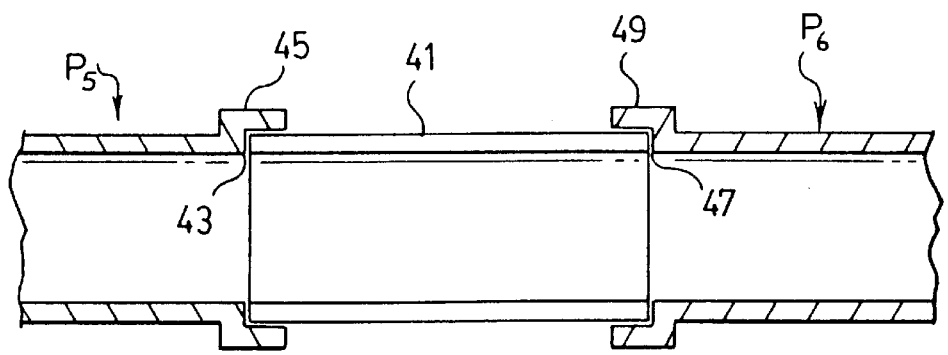
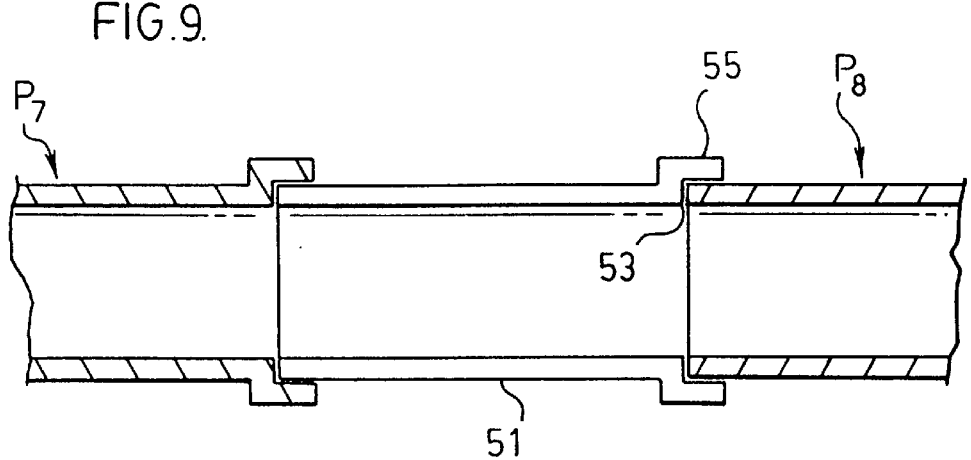

FIRE BLOCK CONDUIT COUPLER

FIELD OF THE INVENTION

The present invention relates to a plastic conduit coupler with fire block capacity.

BACKGROUND OF THE INVENTION

It is well known that conduit such as wire conduits, pipe lines etc. provide easy passage for fire from one area of a building to the next. Accordingly, it is extremely important that these conduits include fire blocks.

A typical fire block is one which blocks passage through a pipe line when the pipe line is subjected to excessive heat. Often fire blocks are made from intumescent material, which as is known in the art, expands when subjected to heat, to block fire through a pipe.

An example of a fire block provided in a pipe line is described in U.S. Pat. No. 3,156,263 issued Nov. 10, 1964 to Adelman. According to the Adelman patent, a steel pipe is provided with foam liner which expands or intumesces inwardly when the heat within the pipe reaches an excessively high level.

Another example of a fire block is described in U.S. Pat. No. 4,424,867 issued Jan. 10, 1984 to Mallow. According to the Mallow patent a sleeve of intumescent material is fitted around a pipe or cable where the pipe passes through a partition. In the event of excessive heat, the sleeve intumesces inwardly under the guidance of the sleeve to block the pipe. The intumescent sleeve is surrounded by intumescent wall filler which is totally separate from the sleeve. This wall filler hardens to prevent fire and smoke from moving through the partition around the pipe.

The installation of the Mallow system, including the fitting of the sleeve over the pipe and the filling of the wall with intumescent material around the sleeve is quite labour intensive. Furthermore, the Mallow system necessitates the creation of an otherwise unnecessarily large hole through the partition around the pipe to accommodate the overall system.

U.S. Pat. No. 4,143,671 issued Mar. 13, 1970 to Olson shows a pipe coupler which simply collapses inwardly to provide a pipe block in the event of excessive heat passing along the pipe.

There is no control in the Olson coupler as to the depth penetration of the pipes into the coupler and therefore, there cannot be any exact fitting of the coupler. Furthermore, the Olson coupler does not intumesce and cannot be used as a partition block and may not even be effective as a pipe block if there is excessive collapsing of the block.

U.S. Pat. No. 4,267,853 issued May 19, 1981 to Yamaguchi discloses a metal pipe coupler including a heat expandable rubber inner tube which expands internally of the coupler in the event of excessive heat. There is no external expansion and therefore the Yamaguchi coupler has no benefit as a wall block.

SUMMARY OF THE PRESENT INVENTION

The present invention provides a conduit coupler which penetrates a fire rated separation in a building e.g., a wall, a floor etc. to couple plastic conduit on either side of the separation. The coupler of the present invention has plastic end regions for an overlapped accurately positioned sealed coupling with the plastic conduit with those end regions being separated by an intermediate region formed by a wall of plastic based intumescent material. This wall of the plastic based intumescent material defines a fluid flow passage through the coupler and has a sufficient thickness of the intumescent material to produce a complete blockage of the passage when the coupler is subjected to conditions which cause an intumescing of the wall forming material of the intermediate region of the coupler.

BRIEF DESCRIPTION OF THE DRAWINGS

The above as well as other advantages and features of the present invention will be described in greater detail according to the preferred embodiments of the present invention in which;

FIG. 1 is an exploded perspective view of a piping system to receive a pipe coupler according to a preferred embodiment of the present invention;

FIG. 2 is a sectional view through the pipe coupler of FIG. 1;

FIGS. 5 through 9 are sectional views showing the coupling of plastic conduits using couplers according to different preferred embodiments of the invention.

Figure 3:
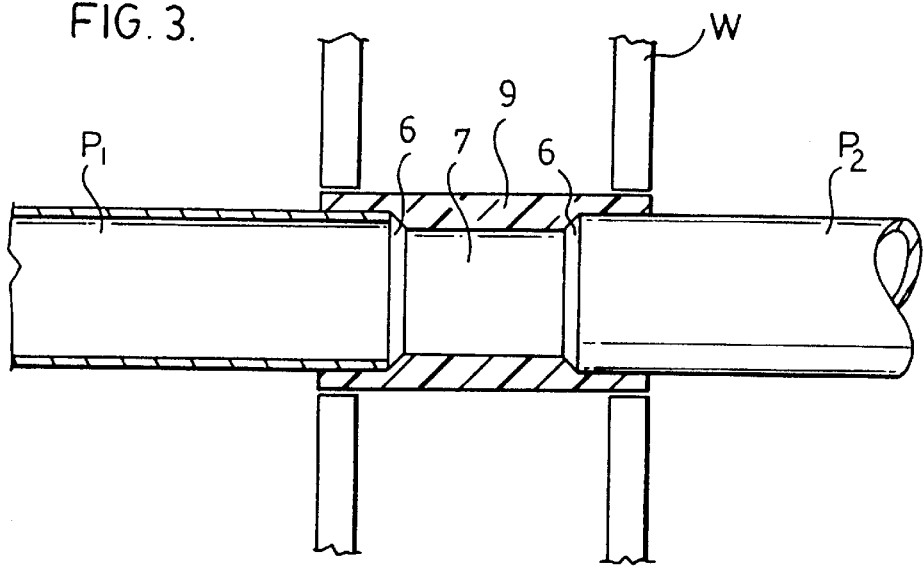
FIG. 3 is an assembled view of the pipe system of FIG. 1.

DETAILED DESCRIPTION ACCORDING TO THE PREFERRED EMBODIMENTS OF THE PRESENT INVENTION IN WHICH:

FIG. 1 shows a conduit system comprising a pair of pipes P1 and P2 to be coupled by a coupler generally indicated at 1. Coupler 1 joins the pipes where they pass through a partition or wall W.

FIG. 2 shows that coupler 1 includes a pair of sockets 3 to opposite ends of the coupler. The sockets are bordered by wall regions S.

Each of these sockets 3 terminates with a pipe end stop 6 in the form of a shoulder of an internal diameter reduced relative to that of each socket. Located between the two pipe end stops is a central passage 7 through the coupler. Passage 7 is bordered by wall region 9 of the coupler. As seen in the drawings wall region 9 is thicker than wall regions 5.

FIG. 3 shows that the coupler conforms very closely to the diameter of the opening through wall W.

Pipes P1 and P2 have a standard plastic construction made from material such as PVC which is additionally a preferred constituent of the coupler. In the coupler the PVC provides a carrier for graphite which gives the coupler its intumescent properties.

The benefit of making the coupler of the same material as that used in the pipes, i.e. PVC, is that the pipes can be welded to the coupler using standard solvents. Further both the pipes and the coupler have the same physical characteristics so that all components of the system react in the same manner to outside forces to help the system stay together. In addition there are no contamination problems as there can be when parts of a plastic system are made from different materials.

In order to assemble the pipe system the two pipes are pushed into the sockets until the pipes hit the socket end stops. As noted above known solvents are used to weld the pipes with the coupler to provide a very accurate leak proof joint of the pipe system where is passes through the partition. The partition itself will typically be fire rated.

Figure 4:
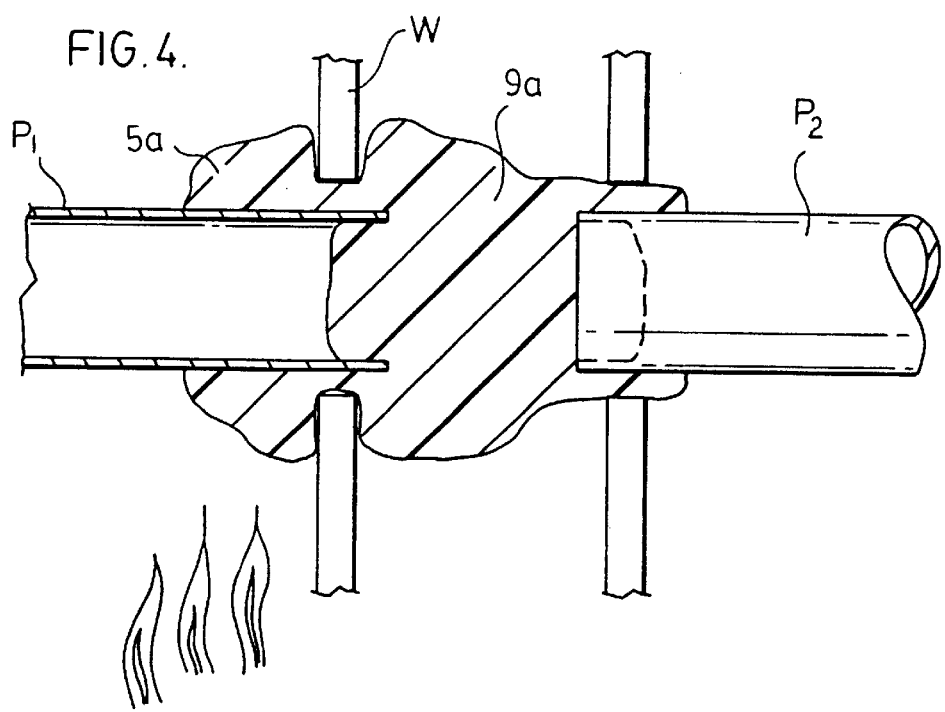
FIG. 4 is a view similar to FIG. 3 showing the pipe system when subjected to fire.

FIG. 4 shows how the pipe coupler reacts when subjected to excessive heat e.g., heat created by a fire or the like. More particularly, it will be seen that the intumescent material making up the side wall regions 5 and 9 of the coupler when subjected to this heat, rapidly expands from its original shape to a much larger mass of material indicated at 9a and 5a in FIG. 4. The expansion of the intumescent material is many times its original size and the expansion is in the direction of the source of the heat which will stop the fire before it has a chance to spread, as described immediately below.

FIG. 4 shows that the expanded material 9a completely closes down the passage through the coupler. Further the expanded material 5a and 9a completely seal off the passage around the pipe system through the wall W. Accordingly, the intumescent material effectively seals off one room area from the next along all areas internally and externally of the pipe system.

It is to be appreciated that eventually the wall and/or the pipe system may give way under intense heat and fire conditions and that the block is only a temporary measure to allow sufficient time to control the situation.

In the embodiment described immediately above, the coupler is, as earlier noted, made entirely from the PVC and graphite combination. When having this composition the coupler is preferably made in a molding process rather than in an extrusion process as used for making the actual pipes. Such a molding process e.g., injection or compression molding lends itself to the shape of the coupler and also provides controlled static conditions to allow the PVC-graphite combination to set up in a manner to withstand normal impact to which the coupler may be exposed.

From the drawings and description above a number of features of this particular coupler become apparent. For example, it will be seen that the walls defining the sockets are not only thinner, they are also shorter in length than the wall defining the intermediate region of the coupler between the sockets. Again, in this particular coupler design the socket walls are about half the thickness of the wall defining the central fluid flow passage of the coupler. They are also about half the length of the central wall region of the coupler. These proportions result in a very efficient use of the intumescent material which is relatively expensive in comparison to stock PVC. With this efficient use of the material the sockets are sufficiently long to provide an overlapped sealed connection with the two pipes adequate to stand up to forces to which the system would normally encounter without using excess intumescent material at the connections. At the same time the thicker longer wall region of the central flow passage of the coupler includes sufficient intumescent material to completely block off the passage when the material does intumesce.

In contrast to the full intumescent material construction of the coupler of FIGS. 1 through 4, FIGS. 5 through 7 show conduit couplers having multiple material construction. In particular, this construction comprises a fluid flow passage defined by a wall of intumescent material and conduit connecting sockets made of a non-intumescing material.

More particularly, FIG. 5 shows a conduit coupler generally indicated at 11 which couples pipes P3 and P4. Once again, this coupling would typically be made where the conduit system penetrates a building separation member with the coupler itself being located interiorly of the separation member.

Coupler 11 comprises a tubular member of intumescent material 13 which once again preferably has a PVC and graphite composition. The tubular member 13 is consistent in diameter, particularly in internal diameter, with the two pipes and as such it forms a smooth continuation of the conduit system through the penetrating member. Once again, the amount of material provided in the wall of tubular member 13 is sufficient to cause a complete blockage of the fluid flow passage in the event that the material forming the tubular member does intumesce.

By way of example only the internal diameter of the fluid flow passage may be in the order of between three and five times the thickness of the wall surrounding the flow passage.

Here it should be noted that the material when intumescing expands both internally and externally of the coupler and the external expansion of the intumescent material acts to seal off the area in the penetrating member around the coupler to prevent smoke and/or fire damage from passing from room to room around the coupler in addition to the internal blockage of the coupler.

In the embodiment of FIG. 5 a pair of collars 15 and 17 are sleeved over the opposite ends of the tubular intumescent member. They are then sealed as by solvent welding or the like to the tubular member to provide permanent sockets at each end of the coupler. In addition to overlapping the intumescent material, the collars 15 and 17 also leave sufficient room to overlap with and seal against the two pipes P3 and P4. The ends of the two pipes when pushed into the two sockets will abut the opposing ends of the intumescent member 13 to provide the accurate location of the coupler relative to the two pipes.

Once again the two sockets are compatible with the two pipes in as much as they can be made from the same pipe material to produce an extremely efficient solvent welding of the coupler to the pipes.

The embodiment shown in FIG. 6 comprises a coupler generally indicated at 21. This coupler includes a single non-intumescent socket forming member 25 which is longer than and sleeved over tubular member 23 formed of intumescent material. The intumescent material therefore becomes a shortened liner for the socket forming member.

As a result of its overlength, the socket forming member extends beyond each end of the intumescent member to enable an overlapped sealed connection with the two pipes P9 and P10 at opposite ends of the coupler.

In this particular embodiment, the intumescent member 23 does not have to be sealed to the non-intumescent outer cover because there is nowhere for fluid to flow other than centrally through the coupler. This is because the sockets are sealed to the two pipes.

FIG. 7 shows a coupler generally indicated at 31 which is similar in design to coupler 21 of FIG. 6 with the exception that the outer cover 35 of the coupler is provided with wall openings 37. These wall openings facilitate expansion of the intumescent material of the coupler liner 33 outwardly of the coupler. However, they also necessitate sealing of the terminal end of the liner 33 to the outer cover 35. This prevents fluid passing through the coupler from escaping out through the openings 37 in the outer cover sleeved over the intumescent lining.

Unlike the embodiment of FIGS. 1 through 4 the embodiments of FIGS. 5 through 7 are not necessarily benefited by production in a molding operation. In these particular embodiments both the tubular intumescent passage forming members and the socket forming members are of a shape which readily enables them to be manufactured in either a molding or an extrusion process. Furthermore, because the sockets which provide the connection for the coupler with the pipes have a non-intumescent construction they can easily be made in an extrusion process and have the sufficient strength and impact resistance to properly secure the coupler with the adjoining pipes.

FIGS. 8 and 9 demonstrate further coupled pipe systems having accurate pipe and coupler positions according to the present invention.

More particularly, FIG. 8 shows a piping system comprising pipes P5 and P6 coupled by an intumescent pipe coupler 41. This pipe coupler would once again couple the pipes where they pass through a building separation. It has the same expansion capabilities as earlier described.

In FIG. 8 coupler 41 is in the form of a straight sleeve with the end stops 43 and 47 to opposite ends of the coupler being provided by the walls of pipes P7 and P8. The pipes are provided with collars 45 and 49 respectively. These collars overlap the coupler and provide solvent receiving securing areas between the coupler and the pipes.

FIG. 9 shows another embodiment of the invention in which pipe P7 is secured through a building separation (not shown) by an intumescent pipe coupler 51. Pipe P7 is identical to pipes P5 and P6, whereas P8 is a straight bodied, non collared pipe. In order to make the coupling with pipe P8, coupler 51 is provided at one end with a collar 55, surrounding pipe P8. The main body of pipe P8 then end stops against the pipe end stop internally of coupler 51.

In the description above, the coupler is used to couple pipes passing through a wall. It is to be understood that the coupler can be used to couple any other type of conduit passing through any other type of building fire and smoke separation.

Although various preferred embodiments of the present invention have been described in detail, it will be appreciated by those skilled in the art that variations may be made without departing from the spirit of the invention or the scope of the appended claims.

The Embodiments of the invention in which an exclusive property or privilege is claimed are defined as follows:

1. A coupler having plastic end regions for an overlapped accurately positioned sealed coupling with plastic conduit to each end of said coupler, said plastic end regions being separated by an intermediate region formed by a wall of plastic based intumescent material defining a fluid flow passage through said coupler, said wall having a sufficient thickness of the intumescent material to produce a complete blockage of the passage when the coupler is subjected to conditions which cause an intumescing of the material.

2. A coupler as claimed in claim 1 wherein said plastic end regions comprises sockets of interior diameter greater than that of said intermediate region to each end of said intermediate region of said coupler.

3. A coupler as claimed in claim 2 wherein said coupler has a one piece molded construction made entirely of the plastic based intumescent material.

4. A coupler as claimed in claim 2 wherein each of said sockets has a wall thickness of about one half of the wall thickness of said intermediate region of said coupler.

5. A coupler as claimed in claim 4 wherein said coupler has an outside diameter which is uniform lengthwise of said coupler.

6. A coupler as claimed in claim 5 wherein the interior diameter of said intermediate region is less that the interior diameter of said sockets by about the wall thickness of each socket.

7. A coupler as claimed in claim 6 wherein said sockets are of equal length and each socket is one half the length of said intermediate region of said coupler.

8. A coupler as claimed in claim 1 wherein said sockets are made of a non-intumescing plastic material consistent with that from which the plastic conduits are made.

9. A coupler as claimed in claim 8 wherein said sockets comprise a pair of socket forming members sleeved over each end of said wall of intumescent material separated from one another on said coupler.

10. A coupler as claimed in claim 8 wherein said socket forming member includes wall openings to facilitate intumescing of the intumescent material through said socket forming member.

11. A coupler as claimed in claim 8 wherein said sockets are formed from a single socket forming member longer than and sleeved over said wall of intumescent material.

12. A conduit system including first and second conduits coupled by a coupler passing through an opening in a fire rated separation of a building, said conduits being made from a plastic material and said coupler being made from an intumescent material including the same plastic material as that from which the conduits are made, said conduit system including collared end stops to opposite ends of said coupler which provide accurate location of said conduits with said coupler and where said coupler and conduits are solvent welded to one another, the intumescent material of said coupler being free to intumesce internally of said coupler to block off said conduit system and to intumesce externally of said coupler to block off the opening in the separation.

13. A conduit system as claimed in claim 12 wherein said coupler has a uniform external diameter greater than that of said conduits and conforming closely with the opening in the separation, and wherein said coupler has receiving sockets at opposite ends of said coupler, said sockets being terminated with internal shoulders which provide said end stops.

14. A conduit system as claimed in claim 14 wherein said coupler has an internal flow passage approximating that said of conduits.

15. A conduit system as claimed in claim 12 wherein said collared end stops are provided in said conduits.

16. A conduit system as claimed in claim 12 wherein one of said collared end stops is provided on one of said conduits and one of said collared end stops is provided on said coupler.

* * * * *